United States Patent [19]

Hunter

[11] 4,122,823
[45] Oct. 31, 1978

[54] TUBELESS HEAT RECUPERATOR

[75] Inventor: Robert F. Hunter, Burlington, Canada

[73] Assignee: The Steel Company of Canada, Limited, Hamilton, Canada

[21] Appl. No.: 730,959

[22] Filed: Oct. 7, 1976

[30] Foreign Application Priority Data

Oct. 8, 1975 [GB] United Kingdom ............... 41318/75

[51] Int. Cl.² .............................................. F28C 3/02
[52] U.S. Cl. ............................... 126/117; 60/39.51 R; 165/111; 165/DIG. 11; 165/DIG. 12
[58] Field of Search .................... 60/39.5, 39.51, 39.66, 60/317, 320, 39.51 R; 165/DIG. 11, DIG. 12, 111; 34/86; 126/117; 237/55

[56] References Cited

U.S. PATENT DOCUMENTS

| | | | |
|---|---|---|---|
| 3,046,732 | 7/1962 | Foa | 60/269 |
| 3,503,704 | 3/1970 | Marks | 60/317 |
| 3,621,654 | 11/1971 | Hull | 60/39.51 R |
| 3,777,484 | 12/1973 | Dibelius et al. | 60/39.66 |
| 3,915,222 | 10/1975 | Hull | 60/39.51 R |

FOREIGN PATENT DOCUMENTS 869,355 5/1961 United Kingdom ........................ 165/1

Primary Examiner—Charles J. Myhre
Assistant Examiner—Sheldon Richter
Attorney, Agent, or Firm—Sim & McBurney

[57] ABSTRACT

This invention provides a method and apparatus for transferring heat to a cooler gas from a hotter gas which contains tri-atomic molecules with good infra-red energy absorption characteristics, for example $CO_2$. The hotter gas is passed in a first direction along a conduit, and simultaneously the cooler gas is jetted through and across the hotter gas in a direction transverse to the hotter gas direction. This allows the tri-atomic molecules minimally entrained in the cooler gas jets to provide heat to the cooler gas firstly through transferring their initial kinetic energy to the cooler gas molecules by way of collision, and secondly by absorbing infra-red energy radiated from the hotter gas and passing this absorbed energy to the cooler gas molecules also through collision.

4 Claims, 8 Drawing Figures

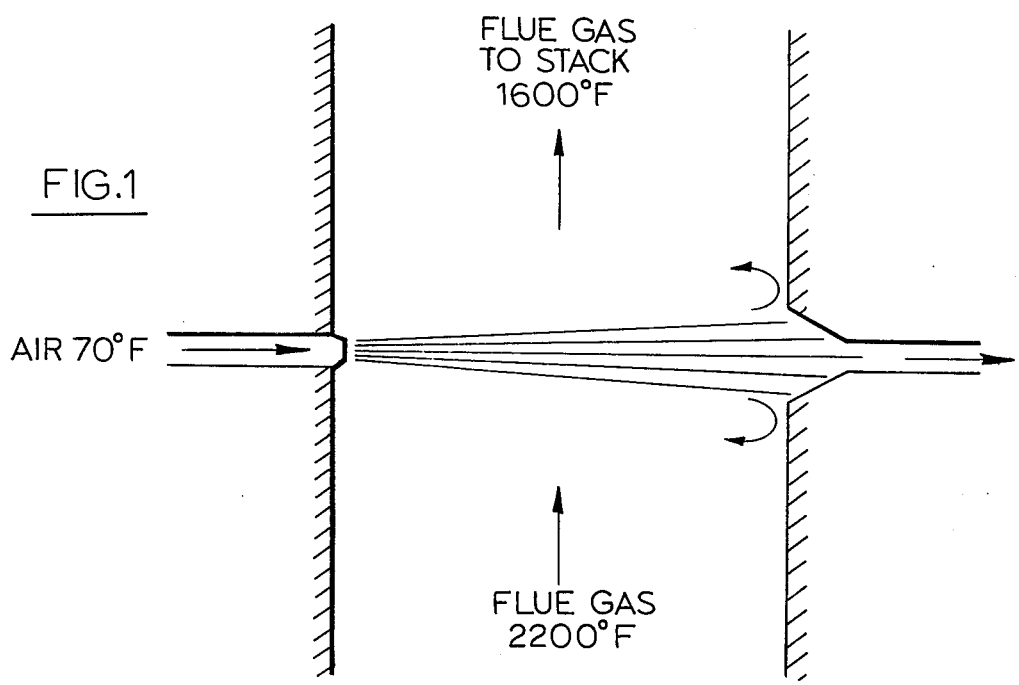
FIG.1
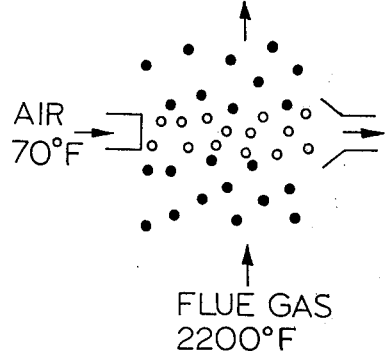
(a) Step 1
Formation of Air Jet
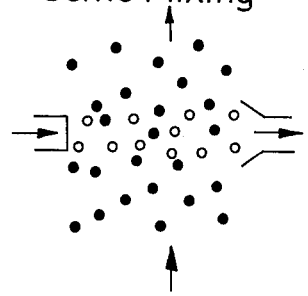
(b) Step 2
Some Mixing
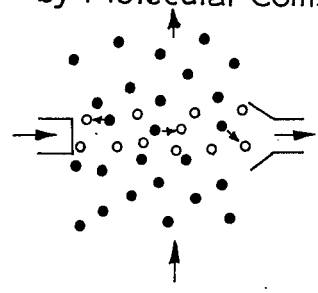
(c) Step 3
Transfer of kinetic Energy by Molecular Collisions
FIG.2
• $CO_2, H_2O$
∘ $O_2, N_2$
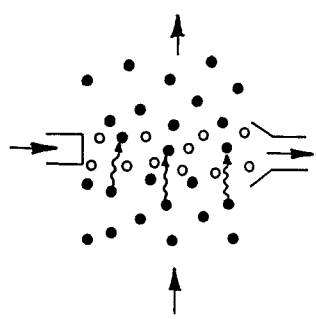
(d) Step 4
Radiant Transfer Between Molecules
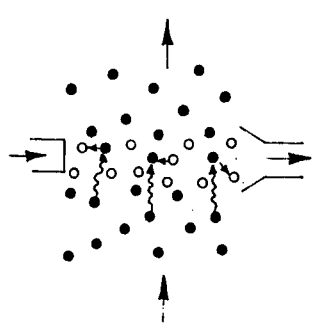
(e) Step 5
Combined Radiant and Collision Transfer

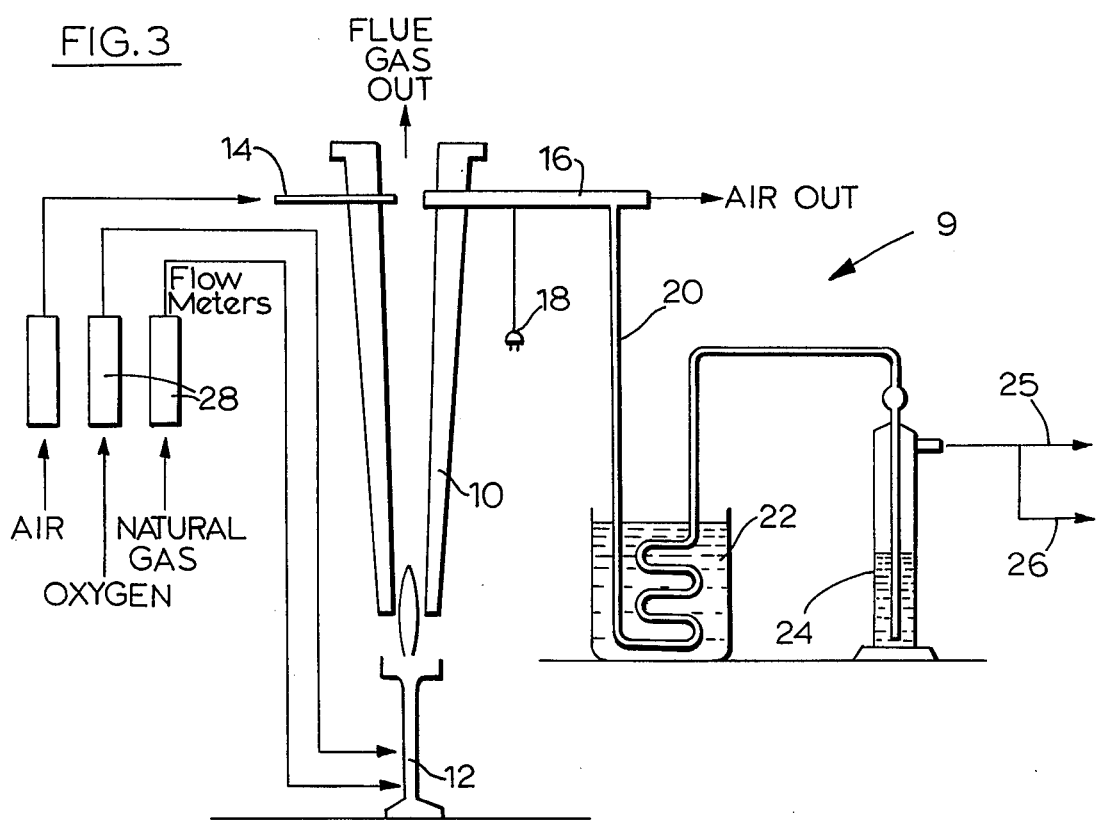
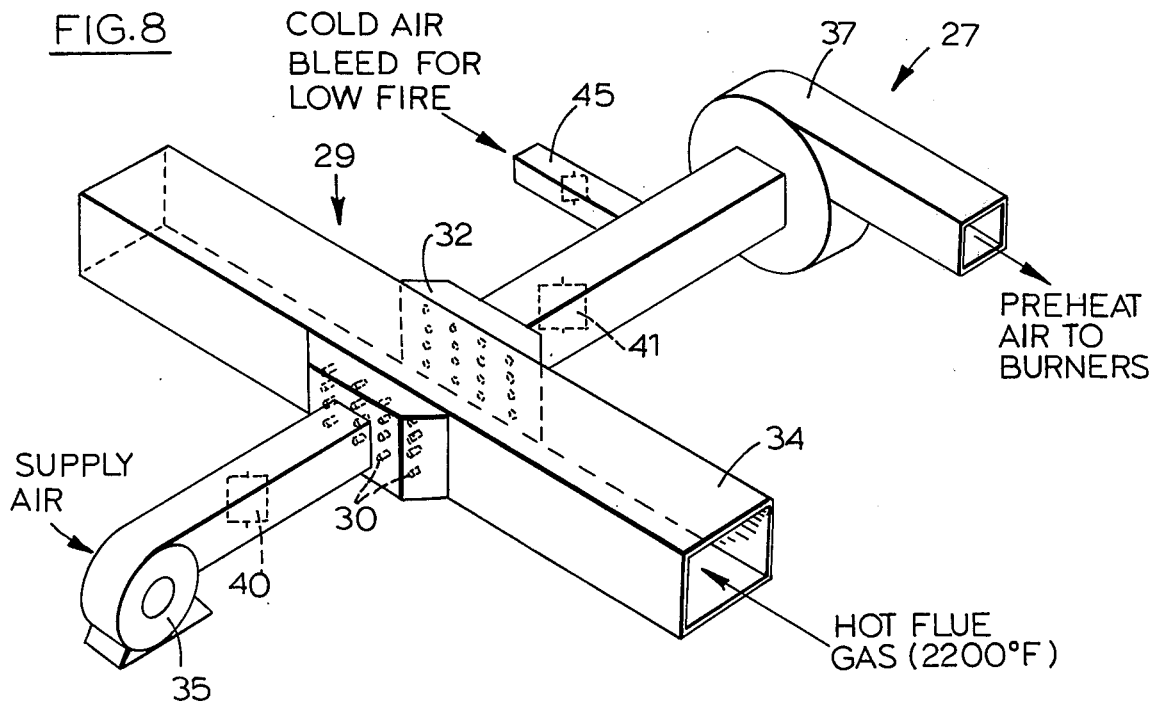

FIG. 4 Heat Input to Air
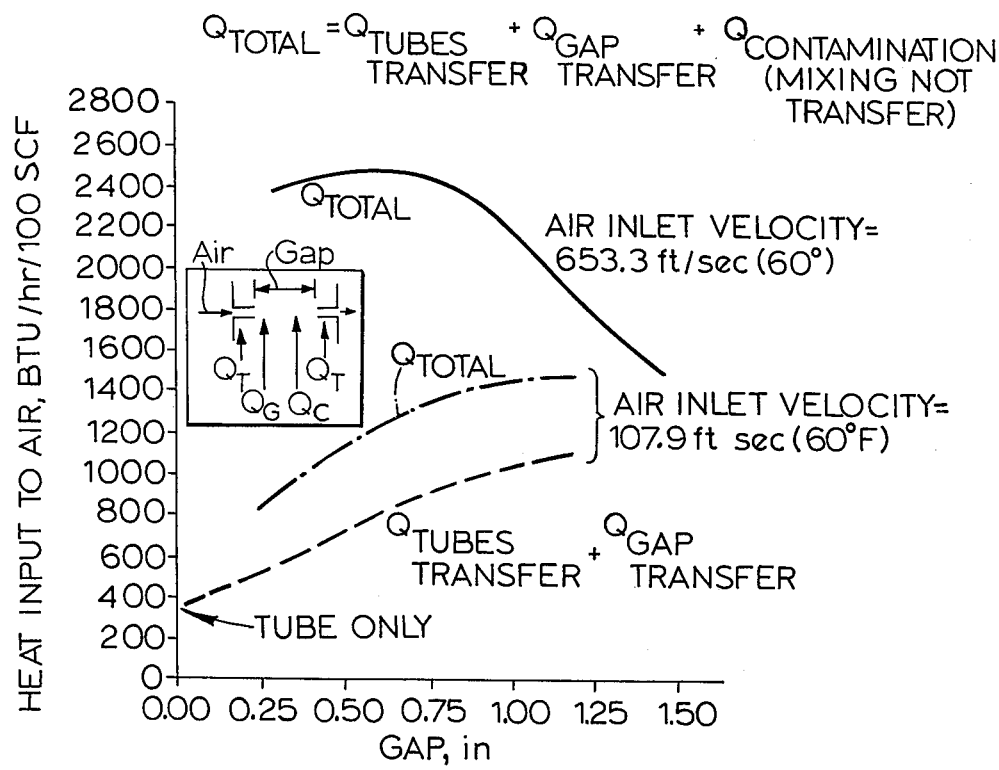
FIG. 5 HEAT TRANSFER IN THE GAP, $Q_{GAP\ TRANSFER}$
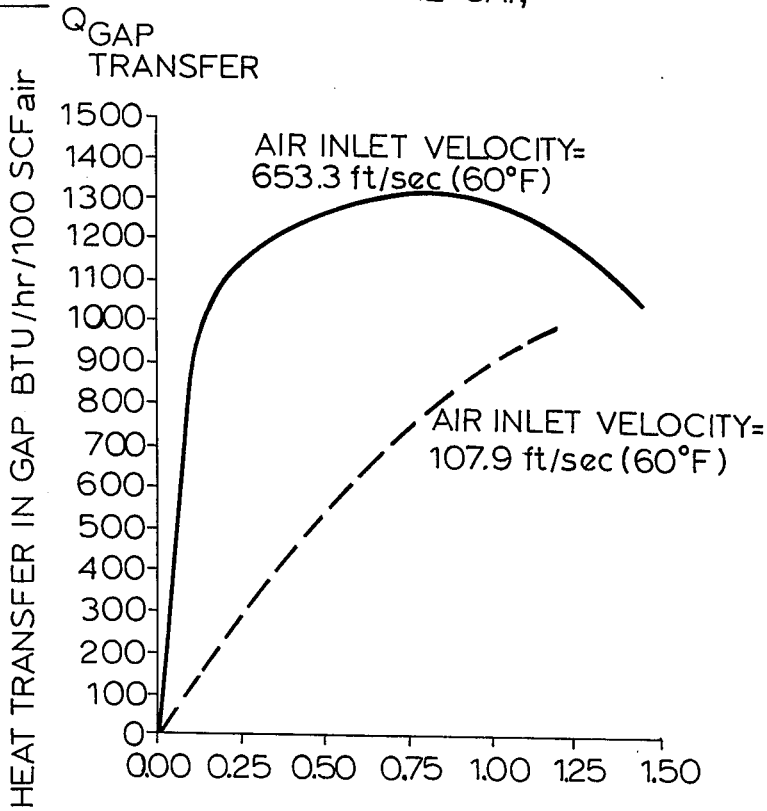

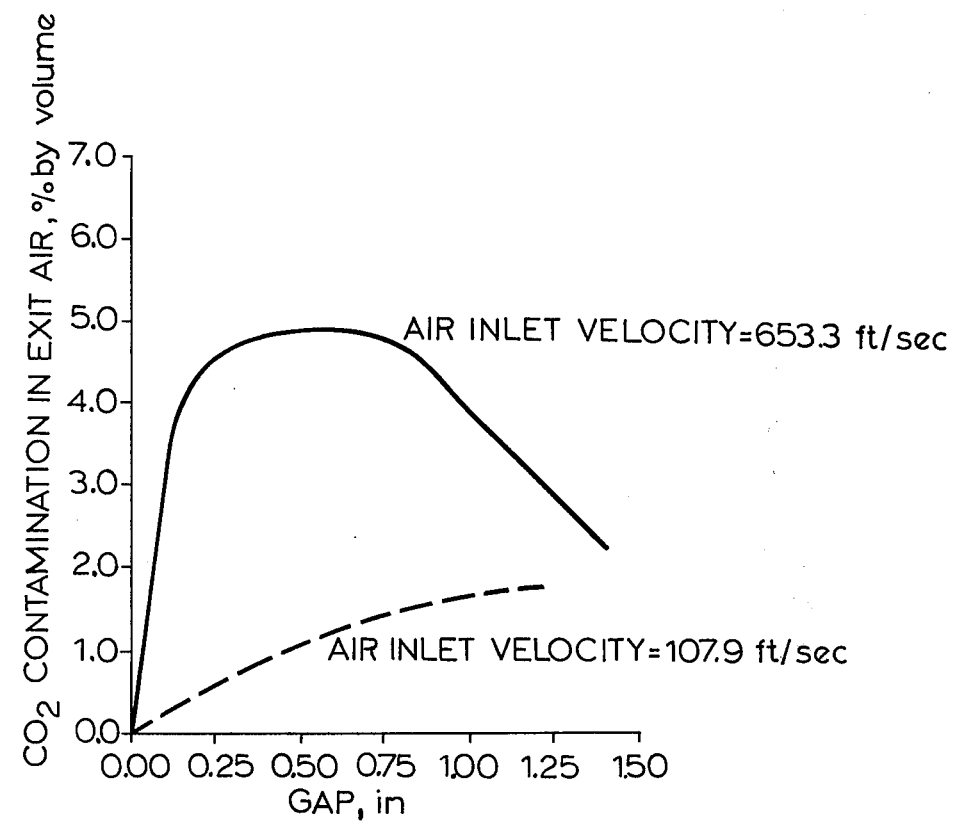
FIG. 6 FLUE GAS CONTAMINATION IN EXIT AIR
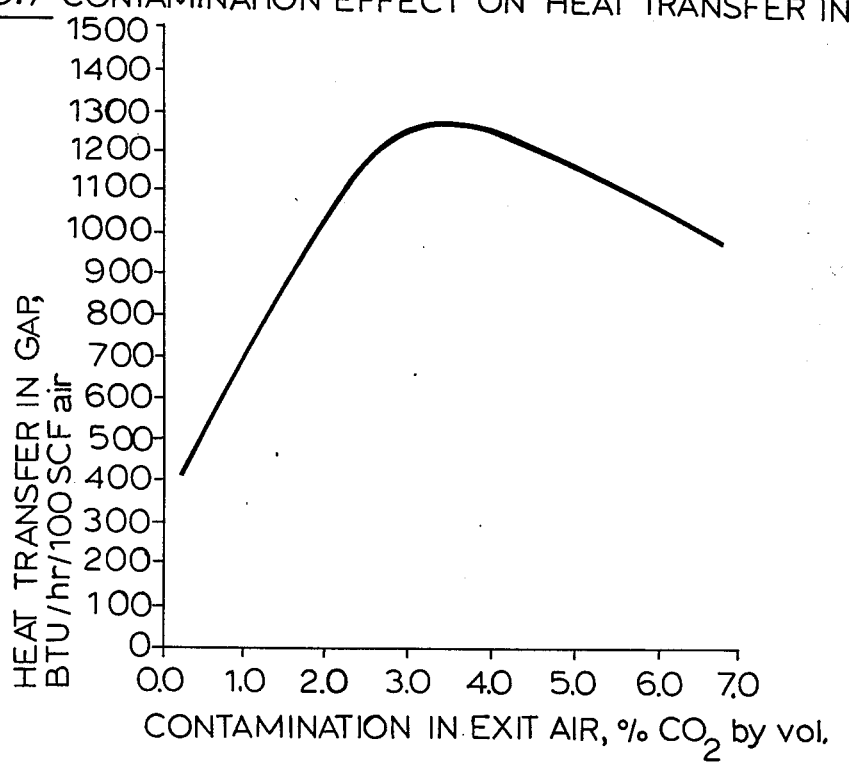
FIG. 7 CONTAMINATION EFFECT ON HEAT TRANSFER IN THE GAP

1

TUBELESS HEAT RECUPERATOR

This invention relates generally to heat exchangers, and has to do particularly with a process and apparatus adapted to transfer heat from a first gas at a higher temperature to a second gas at a lower temperature without the necessity of utilizing a solid transfer surface or partition separating the gases. This invention has particular applicability to the transfer of heat from hot, gaseous products of combustion to oxygen-containing combustion air to be supplied to the location where combustion is taking place.

BACKGROUND OF THIS INVENTION

Industrial furnaces lose 30 to 90% of the energy input in the form of hot flue gases. Heat exchangers can be employed to recover some of this energy in the form of preheat combustion air. Commercial heat exchangers are either of the recuperative or regenerative variety. The recuperative exchanger consists generally of tube and shell designed equipment, with the "coolant" being the combustion air. The equipment either can be located between the furnace and the stack, or can be an integral part of the stack. The heat transfer surface or tubes are constructed of either heat resisting metal alloy or ceramic. The regenerative heat exchanger cycles flue gases between two ceramic heat sinks (network of ceramic shapes which absorb heat, but permit the passage of the gas to the stack). While one ceramic heat sink is being contacted with hot flue gases, the other is being cooled by a flow of combustion air.

The application of conventional recuperative heat exchangers for high temperature furnaces (>2000° F.) has been hampered by high capital costs, space requirements and severe maintenance problems. In the latter regard, fouling of tubes and eventual tube "burn-out" has caused many installations to be abondoned and the furnaces are operating without heat recuperation.

SUMMARY OF THIS INVENTION

The present invention addresses itself to the disadvantages inherent in conventional heat-exchange apparatus as described above. The apparatus of this invention brings two gases into direct contact in a cross-flow pattern, in such a way that heat transfer takes place between the gases without undue mixing. In the specific example to be discussed, the two gases are flue gas and combustion air.

Accordingly, this invention provides apparatus for transferring heat to combustion air for a furnace from hotter flue gas exiting from the same furnace, the flue gas containing tri-atomic molecules with good infra-red energy absorption characteristics comprising: conduit means for passing said flue gas in a first direction, aligned nozzle and aperture means on opposed sides of the conduit means for directing the combustion air in jet form transversely across the flue gas flow, to allow tri-atomic molecules minimally entrained in the jet-form cooler combustion air to provide heat to the cooler combustion air molecules through collision, and by absorbing infra-red energy radiated from the hotter flue gas and passing this absorbed energy to the cooler combustion air molecules also through collision.

PARTICULAR DESCRIPTION OF THE DRAWINGS

One embodiment of this invention will be described with the air of the accompanying drawings, in which like numerals denote like parts throughout the several views, and in which:

FIG. 1 is a vertical sectional view through a tubeless heat recuperator constructed in accordance with this invention;

FIG. 2, parts (a) to (e) illustrate a theoretical mechanism of heat transfer in the process of this invention;

FIG. 3 is a schematic diagram of an experimental apparatus adapted to carry out the process of this invention;

FIGS. 4–7 are graphs useful in discussing the parameters involved in the process of this invention; and FIG. 8 is an isometric view of an apparatus for carrying out the process of this invention in a large installation.

THEORETICAL DISCUSSION

Attention is now directed to FIG. 2, with the help of which the theory behind heat transfer between cross-flow gases will be discussed. FIG. 2(a) is intended to represent the initial formation of a cross-flow jet of cool air (blank dots) passing through a hot flue gas (filled-in dots) consisting of the products of combustion, carbon dioxide and water. Nitrogen, being an inert ingredient of the flue gas, is neglected for simplicity. Some mixing occurs, as illustrated in FIG. 2(b), with a minor number of molecules of carbon dioxide and water being taken into the cross-flow air stream. These molecules transfer their kinetic energy by collision with the cross-flow air molecules, primarily oxygen and nitrogen. The tri-atomic contaminant molecules ($CO_2$ and $H_2O$) excellent absorbers of radiant infra-red energy as compared with the di-atomic air molecules of oxygen and nitrogen. When the temperature or the kinetic energy of the tri-atomic molecules drops in the cross-flow air stream, these molecules can then act as receptors for radiant energy from the molecules in the flue gas stream. This is pictured in FIG. 2(d). The contaminant molecules thus act as heat relays, absorbing radiant energy from the flue gas and transmitting kinetic energy to the cross-flow air molecules. This is illustrated in FIG. 2(e).

With this mode of heat transfer, theoretical heat fluxes of 2,000,000 Btu/hr./ft.$^2$ are considered possible, while conventional devices achieve heat fluxes of 10,000 to 30,000 Btu/hr./ft.$^2$. Some mixing occurs between the two gases. However, in high temperature furnaces, this recycling of small amounts of flue gas should not present difficulties, and in fact could offer advantages in heating uniformity.

It is also considered that the following advantages would be available in the heat transfer of this invention:

(i) low capital cost of equipment, (ii) low maintenance cost, since burnout and fouling of tubes are eliminated, and (iii) utilization as an after-burner for carbon monoxide and nitrogen compounds.

DETAILED DESCRIPTION OF APPARATUS

Attention is now directed to FIG. 3, which shows an experimental apparatus 9 used to test the principal of this invention. The apparatus 9 includes an upwardly diverging alumina flue 10 adapted to conduct hot flue gases upwardly from a burner 12, the flue gas resulting from the combustion of natural gas with oxygen. An injection tube 14 is provided in the wall of the alumina flue toward the upper end thereof, and is adapted to blow high-velocity air laterally across the alumina flue. An exit tube 16 is provided in axial alignment with the injection tube, and has a larger inside diameter. The injection tube 14 is capable of longitudinal positional creased by about 300% when a gap (1.25 in.) was used instead of a stainless steel tube (1,150 Btu/hr./100 scf vs. 385 Btu/hr./100 scf, respectively). The calculations employed in separating the sources of heat input to the cross-flow air are given at the end of this specification and the summarized data are presented in Table I below.

TABLE I

HEAT TRANSFER RESULTS
Heat Transfer Rates at Constant Air Flow of 100 scfh *

| Run No | Inlet Tube Size(I.D.) in | Outlet Tube Size(I.D.) in | Gap in | $O_2$ Exit Air % by Vol | $CO_2$ Exit Air % by Vol | Temp Exit Air °F | Total Heat Input to Air BTU/hr | Heat Transfer Through Inlet Air Tube BTU/hr | Heat Transfer Through Outlet Air Tube BTU/hr | Heat Input By Flue Gas Contamination BTU/hr | Heat Transfer In Gap BTU/hr |
|---|---|---|---|---|---|---|---|---|---|---|---|
| 1 | 0.250 ss | 0.250 | 0.00 | 21 | 0.0 | 275 | 385.17 | 385.17 | — | 0 | 0 |
| 2 | 0.318 ss | 0.318 | 0.00 | 21 | 0.0 | 260 | 357.00 | 357.00 | — | 0 | 0 |
| 3 | 0.400 ss | 0.400 | 0.00 | 21 | 0.0 | 290 | 413.35 | 413.35 | — | 0 | 0 |
| 4 | 0.219 ss | 0.406 | 0.25 | 20 | 1.7 | 550 | 920.49 | 256.78 | 165.00 | 346.80 | 151.93 |
| 5 | 0.219 ss | 0.406 | 0.25 | 21 | 0.0 | 460 | 747.89 | 256.78 | 174.00 | 0 | 317.11 |
| 6 | 0.063 cer | 0.406 | 0.25 | 20 | 6.9 | 1380 | 2591.91 | 215.15 | 82.00 | 1407.60 | 887.16 |
| 7 | 2×0.063cer | 0.406 | 0.25 | 20 | 4.8 | 1260 | 2354.48 | 165.85 | 94.00 | 979.20 | 1115.43 |
| 8 | 2×0.063cer | 0.406 | 0.25 | 21 | 4.3 | 1260 | 2354.48 | 165.85 | 94.00 | 877.20 | 1217.43 |
| 9 | 0.219 ss | 0.406 | 0.50 | 21 | 0.0 | 500 | 824.60 | 192.47 | 170.00 | 0 | 462.01 |
| 10 | 0.063 cer | 0.406 | 0.50 | 20 | 6.5 | 1455 | 2771.92 | 161.37 | 74.50 | 1407.60 | 1125.45 |
| 11 | 2×0.063cer | 0.406 | 0.50 | 20 | 4.8 | 1310 | 2453.41 | 124.58 | 89.00 | 979.20 | 1261.03 |
| 12 | 0.219 ss | 0.406 | 0.75 | 20 | 2.6 | 1130 | 2097.27 | 128.35 | 107.00 | 530.40 | 1331.48 |
| 13 | 0.219 ss | 0.406 | 0.75 | 20 | 2.6 | 1110 | 2057.70 | 128.35 | 109.00 | 520.40 | 1283.91 |
| 14 | 0.219 ss | 0.406 | 0.75 | 20 | 4.3 | 1060 | 1958.77 | 128.38 | 99.00 | 877.20 | 854.18 |
| 15 | 0.219 ss | 0.406 | 0.75 | 21 | 0.5 | 555 | 959.60 | 128.39 | 164.50 | 102.00 | 564.71 |
| 16 | 2×0.063cer | 0.406 | 0.75 | 20 | 4.8 | 1310 | 2453.41 | 82.92 | 89.00 | 479.20 | 1302.29 |
| 17 | 0.219 ss | 0.408 | 1.00 | 20 | 1.4 | 670 | 1150.61 | 85.20 | 153.00 | 285.60 | 647.81 |
| 18 | 2×0.063cer | 0.408 | 1.00 | 20 | 4.1 | 1170 | 2176.41 | 41.46 | 103.00 | 836.40 | 1195.55 |
| 19 | 2×0.063cer | 0.408 | 1.00 | 20 | 3.1 | 1140 | 2117.06 | 41.46 | 106.00 | 632.40 | 1337.20 |
| 20 | 0.219 ss | 0.406 | 1.25 | 20 | 1.9 | 820 | 1483.92 | 0 | 138.00 | 387.60 | 958.32 |
| 21 | 2×0.063cer | 0.406 | 1.25 | 21 | 2.6 | 960 | 1760.92 | 0 | 124.00 | 530.40 | 1106.52 |
| 22 | 0.188 cer | 0.406 | 1.25 | 21 | 1.7 | 780 | 1404.78 | 0 | 142.00 | 346.60 | 915.36 |
| 23 | 0.184 cer | 0.406 | 1.25 | 21 | 1.7 | 830 | 1503.71 | 0 | 137.00 | 346.00 | 1019.91 |
| 24 | 2×0.063cer | 0.406 | 1.50 | 21 | 2.5 | 840 | 1523.49 | 0 | 0 | 510.00 | 1013.49 |

* Combustion Conditions: Gas = 23 scfh, Oxygen = 33 scfh + secondary air location of exit air temp thermocouple = 3.5 inches from flue adjustment, so that the gap between the two tubes can be varied for testing purposes. A thermocouple 18 measures the temperature of the air in the exit tube shortly after it leaves the alumina flue, and a sampling tube 20 conducts a sample of the exit air through a water cooler 22, thence through a dehydration apparatus 24, and finally to a beckman gas chromatograph represented by arrow 25 and to an oxygen monitor represented by arrow 26. Flow meters 28 (at the left in FIG. 3) monitor the flows of air, oxygen and natural gas to the apparatus. The heat transfer to the cross-flow air stream was studied at various gas widths and inlet air velocities. The gap width was altered by repositioning the inlet injection tube 14, while the outlet or exit tube 16 was held in a fixed position, projecting 0.25 in. into the flue gas stream. The inlet air velocity was varied by altering the diameter of the inlet tube.

Oxygen was employed for combustion instead of air, in order to attain flue temperatures over 2000° F. As a consequence, maximum flue gas velocities were about 40% of those experienced in practice.

All room temperature flows were monitored by the use of rotameters. Hot gas flows were estimated using a portable "scoop" type velometer.

The measured temperature of the cross-flow exit air depended upon the location of the thermocouple in the exit tube. This dependence was caused by a combined effect of heat conduction along the tube from the hot end in the flue gas and coolong by the ambient air. A location of 3.5 in. from the flue was selected for monitoring the exit air temperature.

As shown in FIGS 4 and 5, the results indicate that substantially more heat can be transferred between a hot and cold gas when the solid barrier (tube) is removed. For example, the heat input to the air was in- The amount of heat transfer in the gap depends on the gap length and the inlet air velocity. Higher velocities increase the transfer. However, the same degree of transfer can be achieved at lower velocities (approximately 100 ft./sec.) by increasing the gap length. The actual degree of heat transfer appears to depend on the degree of flue gas contamination (see FIGS. 6 and 7) even though the heat input effect from mixing has been substracted. Such a result is in agreement with the model of molecular radiant head transfer, by which the tri-atomic contamination molecules act as heat relays for radiant energy absorption. The degree of contamination appears to have an optimum level corresponding to 3 to 5% of carbon dioxide (18.4 to 16.6% oxygen remaining in the preheated air by calculation). This optimum is likely caused by a balancing of the heat absorption rate to the air and the dilution effect by the flue gas contamination. The observed oxygen levels in the exit air are high compared to those anticipated from calculations from the contamination levels.

Attention is now directed to FIG. 8, which shows schematically a commercial apparatus employing the tubeless heat-exchange process described above. In FIG. 8 a heat recuperator is shown generally at 27, and includes a heat recuperator portion 29 illustrated as a box with short inlet air tubes or nozzles 30 about 6 in. long in a manifold on one side, and a collector hood 32 on the opposite side. The hot flue gas is directed from right to left along a conduit 34 which passes between the inlet air nozzles 30 and the manifold 32. The combustion air is blown across the conduit 34 by a cold air fan 35, and is sucked away from the manifold 32 by a hot air fan 37. It is estimated that adequate air jet velocity will be attained at 250 ft./sec., with pressure drops of about 14 in. of water in the jet system. The energy required to develop these air velocities is expected to amount to about 25 Btu/hr./ 100 scf of air, or 2.5% of the energy recovered at 1,000 Btu/hr./ 100 scf.

The air flow for combustion is controlled by two flow control dampers 40 and 41 located on the entrance and exit streams. It may happen that low firing rates will reduce the jet velocities to the point where increased flue gas contamination results. Such contamination would be equivalent to forced circulation in the furnace, which is considered an advantage in such operations as soaking pits. A cold air bleed 45 can be used on low fire if insufficient air is obtained from the jets. The recycling contamination will maintain the temperature of the preheat air system on low fire.

CALCULATION OF THE HEAT TRANSFER IN THE GAP

The total heat input to the cross-flow air has the following four sources:

(1) transfer through the walls of the inlet air tube which is extending into the flue, (2) transfer through the walls of the outlet tube which is extending into the flue, (3) mixing of flue gas with the air, or (4) transfer in the gap between the hot and cold gases.

Calculations are required to separate the heat input contributions from each of the above sources.

To illustrate the calculations, the following representative run conditions are considered:

| | |
|---|---|
| gap | 1.0 in |
| inlet air velocity | 653.3 feet/sec |
| inlet air flow | 101.6 CFH at 70° F |
| exit air flow | 91 to 112 CFH at 70° F assume air = 101.6 CFH |
| natural gas flow | 23.3 CFH at 70° F |
| oxygen gas flow | 33.9 CFH at 70° F |
| secondary air flow | ? |
| exit flue gas | approx. 101 CFH at 70° F |
| temp. of inlet air | 70° F |
| temp. of exit air | 1140° F |
| temp. of flue gas below cross-flow | 2230° F |
| temp. of exit flue gas | 1620° F |
| exit air composition | |
| - oxygen | 20% by vol. |
| - $CO_2$ | 3.1% by vol. |
| flue gas composition | |
| - $CO_2$ | 24% by vol. |

Calculations:

Total heat input to air = $Q_T$ = 0.26 × 101.6 × 0.0749 × 1070 = 2117.06 BTU/hr.

Sources:

(1) Transfer through the walls of the inlet air tube which is extending into the flue:

Experimentally determined heat flux through the tube for maximum air temperatures of about 300° F. = 33 168 BTU/hr/ft$^2$ Tube area in the flue gas = $\pi$ × 0.23 × 0.25/144 = 0.00125 ft$^2$ Q inlet tube = 33 168 × 0.00125 = 41.46 BTU/hr (2) Transfer through the walls of the outlet air tube which is extending into the flue:

Assume the effect of the outlet tube extends 0.25 inches outside the flue:

Tube transfer area = $\pi$ × 0.5 × 0.5/144 = 0.00545 ft$^2$

Q outlet tube ≃ 18.3 × 0.00545 × ($T_{flue\ gas}$ − $T_{exit\ air}$)

= 0.1 ($T_{flue\ gas}$ − $T_{exit\ air}$)

The overall heat transfer coefficient (18.3) has been estimated from experimental data.

Let the average flue gas temperature = 2200° F. Q outlet tube = 0.1 × (2200 − 1140) = 106.00 BTU/hr (3) Mixing of the flue gas with the air:

Analysis of the data at a constant gap of 1.25 inches and constant flow volume conditions indicates a rise in the exit air temperature of 106° F. per one percent carbon dioxide level of contamination. This rise in temperature corresponds to 204 BTU/hr per one percent carbon dioxide contamination. Calculations based on the sensible heat carried by the flue gas gave an estimated effect of 188 BTU/hr per 1 percent carbon dioxide.

Utilizing the experimental results:

Q mixing = 3.1 × 204 = 632.40 BTU/hr (4) Transfer in the gap:

$Q$ gap = $Q_T$ − $Q_{inlet\ tube}$ − $Q_{outlet\ tube}$ − $Q_{mixing}$

= 2117.06 − 41.46 − 106.00 − 632.40

= 1337.20 BTU/hr

I claim:

1. Apparatus for transferring heat to combustion air for a furnace from hotter flue gas exiting from the same furnace, the flue gas containing tri-atomic molecules with good infra-red energy absorption characteristics comprising:

conduit means for passing said flue gas in a first direction, aligned nozzle and aperture means on opposed sides of the conduit means for directing the combustion air in jet form transversely across the flue gas flow, to allow triatomic molecules minimally entrained in the jet-form cooler combustion air to provide heat to the cooler combustion air molecules through collision, and by absorbing infra-red energy radiated from the hotter flue gas and passing this absorbed energy to the cooler combustion air molecules also through collision.

2. The invention claimed in claim 1, in which the nozzle means includes a plurality of individual nozzles, and the aperture means includes a plurality of apertures each aligned with a respective one of the individual nozzles.

3. The invention claimed in claim 1, in which a first duct provides the cooler combustion air under pressure to the nozzle means, and a second duct removes the cooler combustion air, after being heated by contact with the hotter flue gas, from the aperture means; each duct having damper means for controlling the flow of the cooler combustion gas, the first duct proceeding from the outlet of a first fan means, the second duct leading to the inlet of a second fan means.

4. The invention claimed in claim 3, in which the second duct has an opening through which a controlled additional amount of combustion air can be admitted to the combustion air which has passed across the conduit means in jet form.

* * * * *